May 16, 1939.  C. G. REETZ  2,158,988
STORAGE BATTERY
Filed Feb. 25, 1937
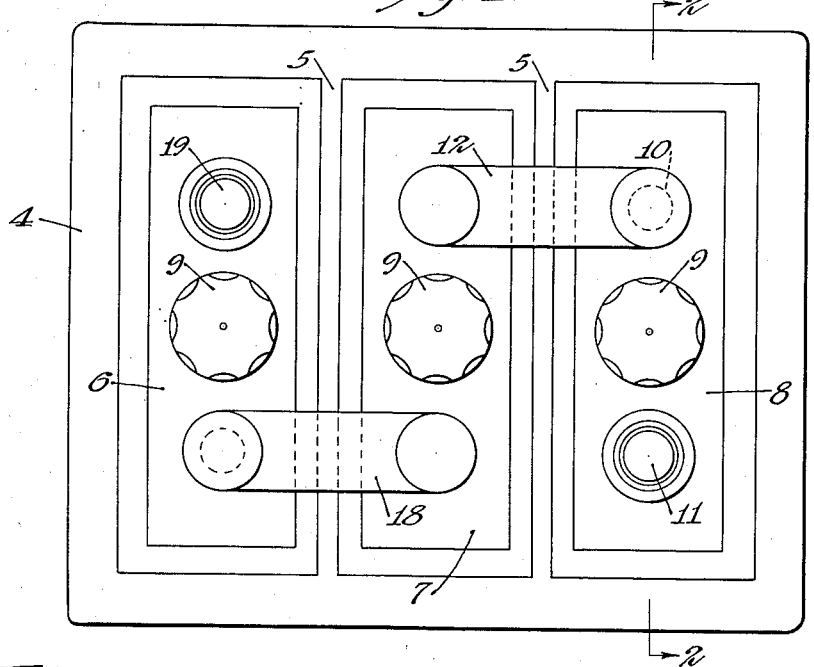
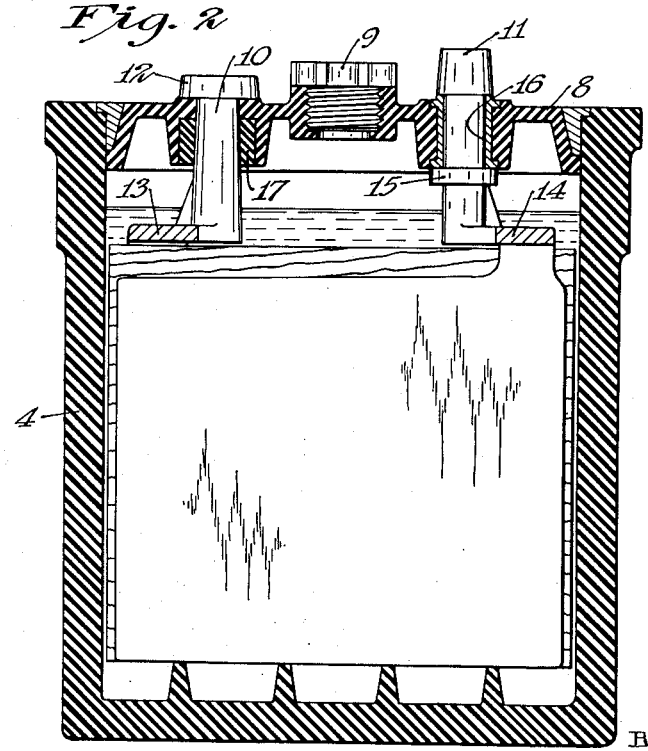
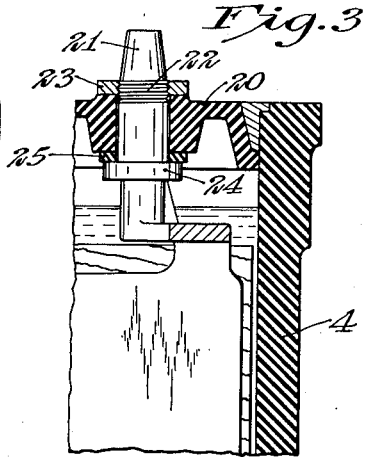
Inventor
Carl G. Reetz
By Stryker & Stryker
Attorneys Patented May 16, 1939

2,158,988

UNITED STATES PATENT OFFICE 2,158,988

STORAGE BATTERY

Carl G. Reetz, St. Paul, Minn., assignor to National Battery Company, St. Paul, Minn., a corporation of Delaware Application February 25, 1937, Serial No. 127,691

3 Claims. (Cl. 136—168)

This invention relates particularly to the construction of the cell covers, posts and connections between the posts and covers of storage batteries.

Storage batteries are commonly provided with a plurality of cells each having a cover which is perforated to allow a pair of the posts to project for the connections with other cells and for attachment of the external cables or circuit wires. It is important that the posts constituting the terminals for attachment of the external cables be securely and rigidly supported on the cell covers to prevent such terminals from being broken loose from the plates within the cell under the forces exerted in attaching and detaching the cables and by other shocks incident to the handling and use of the batteries. However, where both of the posts which penetrate a cell cover are rigidly joined to the cover difficulties are encountered. The covers are sometimes broken because the active materials on the plates of opposite polarity are of such nature as to cause limited relative movement when in use. One common cause of such movement is the growing or building on of the active material on the positive plates at their edges. This results in gradual movement of this group upward while the group of negative plates in the same cell remains stationary. As the posts are rigidly joined to the plates, it is distinctly advantageous to allow slight upward movement of one of the posts of each cell relative to the other. By the present invention, I permit this movement at the post which has the intercell connector attached to it and at the same time afford the desirable rigid, strong cover support for the other or terminal post of the same battery cell.

It is an object of this invention to guard against the breakage of battery covers by permitting limited relative movement between the posts attached to the plate groups of opposite polarity and at the same time afford rigid, strong connections between the terminal posts of a battery and covers thereof.

Other objects are to reduce the cost of battery construction and simplify the attachment and sealing of the posts in the cover by a novel combination of resilient and rigid connections between the cell cover and posts which penetrate the same cover.

The invention will be best understood by reference to the accompanying drawing in which:

Figure 1 is a plan view of my improved battery;

Fig. 2 is a section taken on the line 2—2 of Fig. 1, and,

Fig. 3 is a fragmentary section through an alternate form of rigid connection between a terminal post and cover.

In the drawing the numeral 4 indicates a battery container of common type which is divided by partitions 5 into separate cells each containing a group of positive and a group of negative plates, immersed in a suitable electrolyte. The cell covers are indicated by the numerals 6, 7 and 8. Each cover is provided with a suitable vent plug 9 and formed with vertically extending openings to receive the posts. As shown in Fig. 2, the cover 8 has openings for posts 10 and 11, the latter being one of the main terminal posts for an external circuit connection or cable. Burned to the upper end of the post 10 is an intercell connecting bar 12, and the lower end of this post is rigidly joined to a bar 13 extending across the top of the plates within the cell. One group of plates, for example, the positive plates, are rigidly connected to the bar 13 and the other group or negative plates are secured in similar manner to a bar 14.

The post 11 is rigidly secured to the bar 14 and is preferably formed with an annular shoulder 15 to engage the bottom surface of the cover 8. A metal bushing 16, constructed from a suitable lead alloy, is molded into the cover 8 around the opening for the post 11, fitting snugly about said post and being an integral part of the cover. The bushing 16 is burned onto the post 11, after the cover has been placed on the cell, so that a very strong, rigid connection is afforded between the post 11 and cover. This connection is also of such nature as to effectively seal the joint against the escape of electrolyte from the cell.

The other post which penetrates the cover 8 is preferably formed with a slight taper, having its smaller diameter at its upper end, and fits snugly into a soft rubber bushing 17 of substantial thickness and vertical extent along the post. This bushing is confined in a recess formed in the cover and is sufficiently resilient and compressible to permit slight vertical and lateral movement of the post 10 relative to the cover 8.

Both posts which penetrate the cover 7 preferably fit in soft rubber bushings, such as the bushing 17 shown in Fig. 2, so that these posts are sealed where they pass through the cover and at the same time are allowed slight movement relative to the cover due to the resiliency and compressibility of the bushings. Neither of the posts which penetrate the cover 7 are terminal posts so that they need not be rigidly supported on the cover. One of these posts is connected to the bar 12 and the other to a similar bar 18 extending to a post like the post 10 but projecting from the cell having the cover 6. The other post which penetrates the cover 6 is rigidly joined to and supported by the cover 6 as by a lead bushing, such as the bushing 16 shown in Fig. 2.

An alternate form of rigid connection between a terminal post and covers is shown in Fig. 3. The cover is indicated by the numeral 20 and the post by the numeral 21. This post has a threaded portion 22 which is engaged by a nut 23 adapted to be turned into place after the cover has been mounted in the cell. Beneath the cover, the post is formed with an integral, annular shoulder 24 which is fitted with a washer 25 to form an abutment for the cover 20 and to seal the connection between the post and bottom surface of the cover. It will be understood that the other post of the cell having the cover 20 is sealed by a soft rubber bushing like the bushing 17 which permits slight relative movement between the post and cover.

In use, and during transportation and handling, the battery is protected against damage from forces applied to the terminal posts, as in the attachment and detachment of the circuit cables, by the strong, rigid connections between the posts 11, 19 and 21 and the covers. The covers 6, 8 and 20 which are penetrated by these posts are also protected against breakage under the internal forces in the battery by the resilient connection and movement permitted, as hereinbefore described, between each cover and one of the posts of each pair which penetrates it.

Having described my invention, what I claim as new and desire to protect by Letters Patent is:

1. In a storage battery cell having posts of opposite polarity each rigidly joined to a group of plates, one of said posts being a terminal binding post, the combination of a cover perforated to receive both of said posts, means sealing and rigidly connecting said terminal binding post to said cover and means resiliently sealing the other of said posts in said cover, said last mentioned means permitting relative movement between said post and cover.

2. In a storage battery cell having posts of opposite polarity each rigidly joined to a group of plates, one of said posts being a terminal binding post, the combination of a cover perforated to receive both of said posts, a metallic bushing fixed in said cover, burned to said terminal post and rigidly connecting said terminal post to said cover and means for resiliently sealing the other of said posts in said cover, said last mentioned means permitting relative movement between said post and cover.

3. In a storage battery cell having posts of opposite polarity each rigidly joined to a group of plates, one of said posts being a terminal binding post, the combination of a cover perforated to receive both of said posts, metallic means rigidly connecting said terminal binding post to said cover and relatively soft and compressible means resiliently sealing the other of said posts in said cover and permitting relative movement between said post and cover.

CARL G. REETZ.